United States Patent [19]

Klose

[11] 3,764,640
[45] Oct. 9, 1973

[54] PROCESS OF MAKING PHOSPHORUS AND HALOGEN CONTAINING POLYOLS
[75] Inventor: Werner Klose, Knapsack, Germany
[73] Assignee: Knapsack Aktiengesellschaft, Knapsack, Germany
[22] Filed: July 15, 1971
[21] Appl. No.: 163,097

[30] Foreign Application Priority Data
July 23, 1970 Germany................ P 20 36 587.1

[52] U.S. Cl. .... 260/978, 260/2.5 AJ, 260/77.5 AR, 260/928, 260/929, 260/980
[51] Int. Cl............................. C07f 9/08, C07f 9/02
[58] Field of Search.................... 260/988, 928, 929, 260/978

[56] References Cited
UNITED STATES PATENTS
3,309,427 3/1967 Zech et al...................... 260/978 X
3,099,676 7/1963 Lanham............................ 260/928

Primary Examiner—Joseph P. Brust
Attorney—Arthur G. Connolly, Nathan Bakalar, Jacob C. Kellem, Albert F. Bower, Nicholas E. Oglesby, Jr., Earl Christensen, Richard B. Cornwell, Rudolf E. Hutz, Harold Pezzner, John D. Fairchild, Richard M. Beck, Paul E. Crawford, Jack W. Richards and Lewis H. Wilson

[57] ABSTRACT

The invention provides phosphorus and halogen-containing polyols of general formula (I)

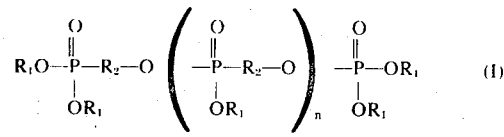

in which $n$ stands for a number of between 0 and 4, $R_1$ stands for at least one halogenated hydrocarbon radical and at least one hydroxylated radical of general formula (II)

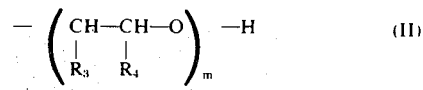

and $R_2$ stands for a radical of general formula (III)

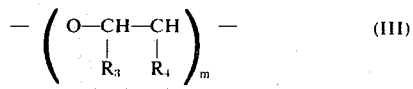

the substituents $R_3$ and $R_4$, respectively, in formulae (II) and (III) standing for a hydrogen atom or a hydrocarbon radical having from one to six carbon atoms and being halogen-substituted, if desired, and $m$ stands for a number of between 1 and 10.

4 Claims, No Drawings

A PROCESS OF MAKING PHOSPHORUS AND HALOGEN CONTAINING POLYOLS

The present invention relates to polyols containing halogen and phosphorus and to a process for making them, the polyols being based on mixed polymeric phosphoric acid esters, of which the ester groups are halogenated or hydroxylated and in which the phosphoric acid groups are linked together by means of hydrocarbon radicals that in turn may be halogenated.

The manufacture of orthophosphoric acid triesters, of which the ester group has a halogen atom or a hydroxyl radical substituent attached thereto, has been described earlier in U.S. Pat. No. 3,256,240, wherein orthophosphoric acid is subjected to condensation with an epichlorhydrin, for example as shown by the following reaction equation:

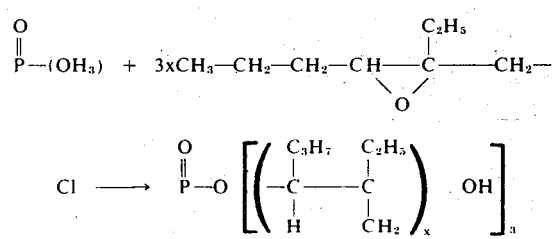

While the compounds having the above composition may be employed as flameproofing agents, for example, the fact remains that this is a commercially unattractive procedure in view of the very costly epoxide compound which is required to be used as a starting material.

It is accordingly an object of the present invention to provide inexpensive polyols containing halogen and phosphorus on the basis of mixed polymeric phosphoric acid esters, of which the ester groups are halogenated or hydroxylated and in which the phosphoric acid groups are linked together by means of hydrocarbon radicals that in turn may be halogenated.

The polyols of the present invention, which have not been described heretofore, have the following general formula (I):

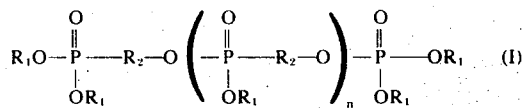

in which $n$ stands for a number of between 0 and 4, $R_1$ stands for at least one halogenated hydrocarbon radical and at least one hydroxylated radical of general formula (II)

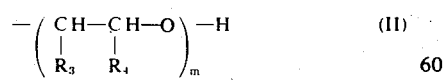

and $R_2$ stands for a radical of general formula (III)

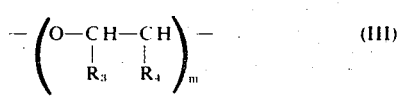

the substituents $R_3$ and $R_4$, respectively, in formulae (II) and (III) standing for a hydrogen atom or a hydrocarbon radical having from one to six carbon atoms and being halogen-substituted, if desired, and $m$ stands for a number of between 1 and 10, preferably 1 and 4. In the above general formula (I), $R_1$ may more particularly stand for an aliphatic or cycloaliphatic radical having one or more halogen atom substituents, for example a 2-chloroethyl radical or 2-bromoethyl radical, or stands for an aryl radical having at most 8 carbon atoms and one or more halogen substituents whereas $R_3$, $R_4$ stand for a hydrogen atom, a methyl radical or chloromethyl radical.

The polyols of the present invention also comprise mixtures of the products of general formula (I) and compounds of general formula (V)

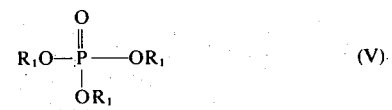

in which $R_1$ stands for a halogenated hydrocarbon radical. The compounds of general formula (V) are obtained as byproducts in the manufacture of the polyols of formula (I).

A further object of the present invention is to provide a process for making the phosphorus- and halogen-containing polyols of general formula (I), comprising a first reaction step, wherein a halogenated aliphatic or cycloaliphatic alcohol or a halogenated phenol, is reacted, at a temperature of between 20° and 150°C, preferably between 50° and 100°C, over a period of between 0.5 and 5 hours and, if desired, in the presence of a phosphorous acid stabilizer and a disodium phosphate regulator, with $P_2O_5$ in a molar ratio of less than 3:1, or with a polyphosphoric acid or a mixture thereof with $P_2O_5$, so as to produce a mixture of partially esterified polyphosphoric acids; and a second reaction step, wherein the first step reaction mixture, which may be cooled, if desired, is reacted with an epoxide of general formula (IV)

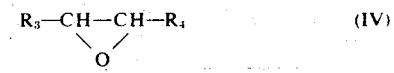

in which $R_3$, $R_4$ stand for a hydrogen atom or a hydrocarbon radical having from one to six carbon atoms and being halogenated, if desired, so as to oxalkylate the free acid groups of the partially esterified polyphosphoric acid with the resultant formation of a polyol of formula (I) above.

As already mentioned earlier herein, the product mixture of formula (I) obtained by the process of the present invention also contains compounds of general formula (V)

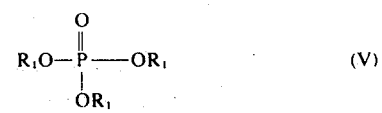

in which $R_1$ stands for a halogenated hydrocarbon radical and/or a hydroxylated radical.

The starting material used in carrying out the process of the present invention preferably is a halogenated aliphatic or cycloaliphatic alcohol or a halogenated phenol having at most 8 carbon atoms. 2-Chloroethanol or 2-bromoethanol, for example, are very useful starting materials for practical purposes. In the process of the present invention, the phosphorous acid stabilizer is intended to avoid thermal change of the resulting polyol, so as to obtain it as a colorless product. The phosphorus acid should conveniently be added to the starting mixture at a rate of between about 0.1 and 2 weight percent, based on the final product. The disodium phosphate is effective in the second step reaction only, in which it effects a fairly complete reaction of the epoxide with the intermediary product obtained in the first step reaction. Optimum conversion rates are obtained by using the reaction mixture in combination with between about 0.1 and 2 weight percent of disodium phosphate, based on the intermediary product of the first step reaction.

In the epoxide reaction component of formula (IV) above, the substituents $R_3$, $R_4$ preferably stand for a hydrogen atom, a methyl or chloromethyl radical. The useful epoxides include ethylene oxide, propylene oxide or epichlorhydrin, for example. The acid groups react substantially completely with the epoxide if use is made of a temperature of between about 60° and 120°C, in the second step reaction. Following completion of the reaction, unreacted epoxide is expelled from the reaction mixture, for example by means of nitrogen at a temperature of between about 80° and 120°C.

The following statements are intended further to illustrate the present invention.

The products obtained in the first step reaction of the present process generally comprise mixtures of various esters of polyphosphoric acids which present different degrees of condensation and are in equilibrium with each other. This can be established by determining the isolated or terminal and middle $PO_4$-groups by nuclear magnetic resonance spectroscopy.

In principle, the process of the present invention is an esterification or oxalkylation reaction which, however, takes an unexpected course. This in view of the fact that the oxalkylation of the free acid groups of the partially esterified polyphosphoric acids does not terminate the reaction, which unexpectedly and additionally effects the incorporation of the formula-(III)-radical into the -P-O-P- fundamental frame. This incorporation can be interpreted to the effect that the hydroxylated ester group of the polysphosphoric acid ester effects alcoholysis of the -P-O-P- frame as illustrated by the following general reaction equation:

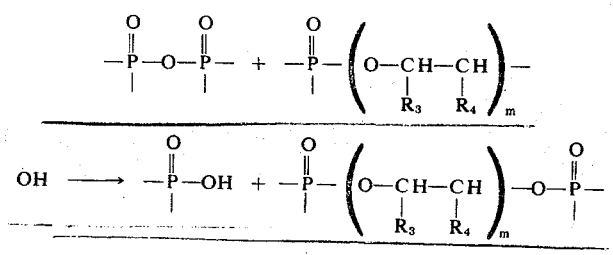

The structural element of the formula:

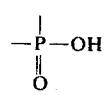

which is formed upon alcoholysis, is oxalkylated anew by epoxide present in the reaction mixture.

The products obtained by the process of the present invention are of commercial interest as flame proofing agents. For example, the products of the present invention may be condensed with an equivalent portion of at least one organic isocyanate compound to produce fire resistant polyurethanes. Such polyurethanes can be produced Difficulty foams and find use as, for example, heat and sound insulation. The condensation can be initiated by conventional activators such as tertiary amines and/or organotin compounds. Foams can be prepared by adding customary expanding or blowing agents such as chlorofluoroalkanes and/or water. Suitable isocyanate compounds are 2,4- or 2,6-toluylenediisocyanate. Further details for converting the polyols of this invention to fire resistant polyurethanes can be found in copending application Ser. No. 146,785 filed on May 25, 1971 in the names of Joachim Wortmann, Frans-Josef Dany and Joachim Kandler and entitled "Difficulty Inflammable Polyurethanes and Process for Making Them," which application is incorporated herein by reference. The process itself permits the manufacture of a wide variety of polyols, with respect to their constitution. By an appropriate selection of the quantitative ratios and nature of the starting components for use in the first step reaction, it is possible to vary both the ratio of halogen-substituted/hydroxyl-substituted ester groups, and the mean chain length of the resulting final product. Further possibilities of variation reside in the use of mixtures of various epoxides. In other words, the present process is very flexible and therefore permits the manufacture of products having predetermined and specific properties satisfying widespread commercial specifications.

EXAMPLE 1

A reactor fitted with stirrer, thermometer, gas inlet and reflux cooler was charged first with 241.5 grams of 2-chloroethanol (3 mols) and 213 grams of phosphorus pentoxide (1.5 mols) were successively added with the exclusion of air and moisture, which were expelled by means of nitrogen flowing countercurrently with respect thereto. The reaction mixture was maintained at a maximum temperature of 40°C by cooling with ice. Following complete dissolution of the phosphorus pentoxide, 1 gram of phosphorus acid and 1.2 grams of $Na_2HPO_4$ were added. The mixture was stirred for 30 minutes at 45°C. The reflux cooler was charged with a blend of methanol and dry ice, and ethylene oxide was then introduced into the reaction mixture at 50°C until strong reflux indicated that the reaction was complete. Unreacted ethylene oxide was expelled at 90°C by means of nitrogen. 895 grams of a slightly yellowish liquid were obtained. Ethylene oxide was absorbed at the rate of 438.3 grams (approximately 10 mols). The product contained 23.9 weight percent of $P_2O_5$, 11.4 weight percent of chlorine and had a hydroxyl number of 212 milligrams of KOH/gram. Its acid number was smaller than 1 milligram of KOH/gram.

EXAMPLE 2

125 grams of 2-bromoethanol and 71 grams of $P_2O_5$ were reacted in the apparatus described in Example 1 with strong cooling so as to maintain a maximum temperature of 40°C. 0.5 gram of $H_3PO_3$ and 0.5 gram of $Na_2HPO_4$ were successively dissolved in the reaction mixture and ethylene oxide was introduced thereinto until strong reflux indicated that the reaction was complete. Ethylene oxide in excess was expelled at 80°C by means of nitrogen. 333 grams of a brownish liquid, which contained 21.2 weight percent of $P_2O_5$ and 21.5 weight percent of bromine and had a hydroxyl number of 188 milligrams of KOH/gram, were obtained.

I claim:

1. A process for the manufacture of phosphorus and halogen-containing polyols of the general formula (I)

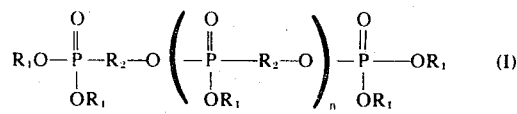

in which $n$ stands for a number of between 0 and 4, $R_1$ stands for a chloroethyl or bromoethyl radical and a hydroxylated radical of the general formula (II)

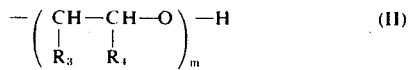

and $R_2$ stands for a radical of general formula (III)

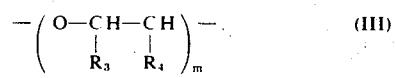

the substituents $R_3$ and $R_4$, respectively, in formula (II) and (III) standing for a hydrogen atom, a methyl radical or a chloromethyl radical, and $m$ stands for a number of between 1 and 10, the said process comprising a first reaction step, wherein 2-chloroethanol or 2-bromoethanol is reacted with $P_2O_5$ in a molar ratio of less than 3:1 and more than zero at a temperature of between 20 and 150°C over a period of between about 0.5 and 5 hours, in the presence of between about 0.1 and 2 weight percent of phosphorus acid as stabilizer and between about 0.1 and 2 weight percent of disodium phosphate as regulator, the amounts of stabilizer and regulator being based on the first step reaction product; and a second reaction step, wherein the first step reaction mixture is reacted with an epoxide of general formula (IV)

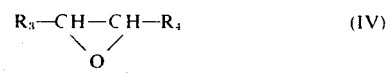

in which $R_3$, $R_4$ stand for a hydrogen atom, a methyl radical or a chloromethyl radical at a temperature of between about 60° and 120°C so as to oxalkylate the free acid groups of the first step reaction mixture with the resultant formation of a polyol of formula (I) above.

2. The process as claimed in claim 1, wherein the reaction product of general formula (I) is obtained in combination with compounds of general formula (V)

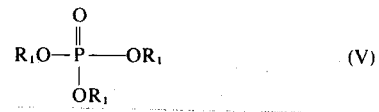

in which all of the substituents $R_1$ stand for chloroethyl or bromoethyl, or the hydroxylated radical of the general formula (II) or a part of the substituents stands for chloromethyl and bromoethyl respectively, and the balance substituents stand for the hydroxylated radical of the general formula (II).

3. The process as claimed in claim 1, wherein the first step reaction is carried out at a temperature of between about 50° and 100°C.

4. The process as claimed in claim 1, wherein the epoxide is ethylene oxide, propylene oxide or epichlorhydrin.

* * * * *